United States Patent [19]

Hervé

[11] Patent Number: 4,886,605
[45] Date of Patent: Dec. 12, 1989

[54] ALL-PURPOSE SEPTIC TANK
[75] Inventor: Philip Hervé, Montpellier, France
[73] Assignee: Eparco, Paris, France
[21] Appl. No.: 282,948
[22] Filed: Dec. 5, 1988

Related U.S. Application Data

[63] Continuation of Ser. No. 29,077, Mar. 23, 1987, abandoned.

[30] Foreign Application Priority Data

Mar. 25, 1986 [FR] France .................. 8604265

[51] Int. Cl.⁴ .............................................. B01D 21/02
[52] U.S. Cl. ................................. 210/170; 210/519; 210/532.2; 210/539
[58] Field of Search ...................... 210/170, 532.2, 539, 210/540, 519

[56] References Cited

U.S. PATENT DOCUMENTS

| | | | |
|---|---|---|---|
| 1,164,527 | 12/1915 | Kelly, Jr. ............................ | 210/540 |
| 1,616,394 | 2/1927 | Schiding ............................ | 210/539 |
| 1,644,532 | 10/1927 | Ledyard et al. .................. | 210/532.2 |
| 2,284,737 | 6/1942 | Hirshstein ......................... | 210/539 |
| 2,792,125 | 5/1957 | Gallacher ......................... | 210/532.2 |
| 3,545,617 | 12/1970 | Hamrick ........................... | 210/532.2 |
| 3,630,370 | 12/1971 | Quina ............................... | 210/532.2 |
| 3,826,376 | 7/1974 | Carlson et al. .................... | 210/529 |
| 4,363,732 | 12/1982 | Crates et al. ...................... | 210/532.2 |

FOREIGN PATENT DOCUMENTS

| | | | |
|---|---|---|---|
| 645510 | 10/1928 | France ............................. | 210/532.2 |
| 2381722 | 10/1978 | France ............................. | 210/532.2 |

Primary Examiner—Richard V. Fisher
Assistant Examiner—Christopher Upton
Attorney, Agent, or Firm—Fred A. Keire

[57] ABSTRACT

An all-purpose septic tank comprising a chamber (1), a waste water inlet pipe (2), an outlet pipe (3) for conveying the clarified water to a land treatment system, means (5) for effecting clarification through deposition of the heaviest substances on the bottom (4) of the chamber (1) and through accumulation of the greasy substances and light particles on the surface S and for at least partially liquefying these substances by means of anaerobic fermentation, means (6), incorporated inside the chamber (1) itself, for protecting the land treatment system so as to prevent it becoming clogged up, the clarification and liquefaction means (5) and the protection means (6) being located inside a single compartment of the chamber (1).

29 Claims, 2 Drawing Sheets

ALL-PURPOSE SEPTIC TANK

This application is a continuation of application Ser. No. 029,077, filed Mar. 23, 1987, now abandoned.

BACKGROUND OF THE INVENTION

1. Field of the Invention

The invention relates to an all-purpose septic tank.

An all-purpose septic tank receives all of the domestic waste water, i.e. the sanitary waste water (from WC's) and the household waste water (from kitchens and bathrooms).

A septic tank must perform three functions: collect the water, liquefy, at least partially, the pollutants in the waste water and retain the solids and floating debris. In accordance with the most recent regulations applicable since 1982, a septic tank must be arranged so to avoid direct flow between the inlet and outlet devices and also prevent sediment and floating matter, for which a sufficient volume is retained, from being stirred up and carried along. The working height of the water must not be less than 1 m. It must be sufficient to allow a liquid zone inside which the effluent outlet device is located. The effluent inlet device must be dimensioned such that it does not form an obstruction of any kind and designed so as to avoid stirring up the separated matter. The depth at which the effluent outlet device is immersed must be such that it prevents entrainment of floating matter and limits entrainment of separated matter which may have been stirred up. The partition which may be placed inside the tank must be provided with orifices of adequate dimensions and arranged so as to prevent direct flow between the inlet and outlet devices.

2. Description of Related Art

Previously, the regulations restricted the use of septic tanks to sanitary waste water alone.

This change in the regulations has influenced developments in the state of the art.

Thus, from a first development in the prior art, where the use of septic tanks was limited to sanitary waste water, a septic tank is already known (French Patent No. 2,050,858), comprising a chamber divided into two compartments: an inlet compartment into which an effluent inlet pipe leads and an outlet compartment from which a clarified-water outlet pipe leads. Such a septic tank must also be provided with a purifying device consisting of a bacteria bed, an absorbant layer or an underground treatment system. This purifying device is often ineffective or is not used or does not even exist. Such a purifying device is illustrated, for example, in French Patent No. 2,057,419.

Various embodiments have been proposed for such septic tanks, with the following stated aims: to increase the strength of the septic tank (French Patent No. 2,054,970) by providing three continuous chambers inside it; to enable the construction of large-capacity septic tanks by means of partitioning (French Patent No. 2,110,681); to incorporate a filter inside the actual septic tank (French Patent No. 2,158,165); to enable easier and more rapid manufacture of the septic tank (French Patent Nos. 2,215,517, 2,482,157 and 2,496,143); finally, to enable the septic tank to be disassembled and easily transported (French Patent No. 2,386,651).

It is also envisaged (French Patent Nos. 2,110,746, 2,307,922 and 2,427,438) to arrange two independent subassemblies for treating sanitary waste water and household waste water, next to each other in a single assembly, so as to comply with the regulations formerly in force.

The most conventional structure for these septic tanks consists in the inlet compartment having a volume which is larger (in particular twice as large) as the outlet compartment, the two compartments being separated from each other by a transverse partition which is located inside the chamber and projects beyond the liquid level so as to prevent floating particles passing from the first to the second compartment. An opening is provided in the partition, in particular in its middle region, so as to allow the water to pass from the first to the second compartment, while ensuring that the first compartment performs its clarifying function. The inlet and outlet consists most commonly of pipes which are bent downwards and located at the same height. A manhole is usually provided in the chamber cover.

The most recent regulations on all-purpose septic tanks designed to receive all domestic sewage led to a second development.

Manufacturers first of all purely and simply proposed to increase the volume of the tanks so as to cater for the increased amount of waste water to be treated. However, this solution proved to be ineffective because the hydraulic operation of an all-purpose septic tank is completely different from that of a conventional septic tank intended for sanitary waste water alone. This resulted in the removal of sludge, particles, greasy substances, etc. by the septic tank, causing clogging of the land treatment system located downstream of the septic tank.

In order to overcome this drawback, it was proposed to combine with the septic tank, immediately downstream of it, an operation indicator which signals entrainment of the sludge, i.e. incorrect operation of the septic tank. This operation indicator is called, depending on the situation, a prefilter, colloid separator or coarse-particle filter. This combined arrangement consisting of an all-purpose septic tank and colloidal prefilter is described in French Patent Nos. 2,503,216 and 2,499,125. The latter French Patent No. 2,499,125 envisages, moreover, the possibility of cleaning the filters by reversing the direction of flow of water. However, the existence of a separate prefilter or colloid separator has given rise to certain problems and this is why it was then proposed to incorporate the said filter inside the all-purpose septic tank. This gave rise to all-purpose septic tanks in which the prefilter or colloid separator is situated inside the second compartment (French Patent Nos. 2,523,618, 2,531,635, 2,550,566 and 2,554,843). In these septic tanks, the outlet leads directly to the operation indicator usually fixed, on the one hand, to the chamber cover and, on the other hand, to the separating partition. Two manholes are provided so that access can be gained to the first compartment and the operation indicator, respectively. Numerous detailed embodiments of such all-purpose septic tanks with an incorporated prefilter or colloid separator have been proposed. Experience shows that, using the operation indicator, it is possible to detect clogging of the tank and hence the need for drainage before the land treatment system has itself become clogged up. On the other hand, these all-purpose septic tanks do not perform in an optimum manner their functions of liquefying and retaining solid matter, thereby giving rise to increased maintenance costs.

SUMMARY OF THE INVENTION

The invention therefore aims to solve simultaneously the threefold problem of protecting the land treatment system; ensuring optimum operation of the septic tank with regard to its collecting, liquefying and retaining functions; and increasing the storage capacity.

In fact, according to the latest known art, it has been shown that the user of a prefilter or colloid separator incorporated into the septic tank certainly solves the problem of protecting the land treatment system, but seriously affects actual operation of the septic tank and the storage capacity of the latter.

For this purpose, the invention proposes an allpurpose septic tank which comprises a chamber; a waste-water inlet pipe; an outlet pipe for conveying the clarified water to a land treatment system; means for separating the substances through deposition of the heaviest substances on the bottom of the chamber and through accumulation of the greasy substances and light particles on the surface and for at least partially liquefying these substances by means of anaerobic fermentation; and means, incorporated inside the chamber itself, for protecting the land treatment system so as to prevent it becoming clogged up. The all-purpose septic tank according to the invention is such that the clarification and liquefaction means and the protection means are located inside a single compartment of the chamber.

Thus, unlike the all-purpose septic tanks of the state of the art, the all-purpose septic tank according to the invention comprises a single compartment and not two totally separate compartments. Moreover, the all-purpose septic tank according to the invention does not have a device such as a prefilter or colloid separator which occupies a large part of the septic tank. Consequently, the all-purpose septic tank according to the invention is particular suitable for industrial manufacture since its component parts have small dimensions and are able to pass through inspection ports. It has been shown that a septic tank according to the invention performs better than the septic tanks of the known art. Thus, for a septic tank of 3 $m^3$, the volume of stored sludge may exceed 1700 liters, while it is less than 1150 liters according to the present state of the art. The area of interchange between the sludge and the liquid floating on the surface is also increased by 50% and may exceed 2 $m^2$ or 3.3 $m^2$ during operation or when there is the maximum amount of sludge, respectively. The embodiment of the waster-water inlet pipe is such that there is no risk of the pipe trapping greasy substances, thereby preventing clogging of the inlet device. Above the water level, there is a communication passage between the inlet and the outlet, thereby ensuring proper ventilation of the septic tank. The outlet device can be easily accessed and removed. It is designed such that the sludge does not clog it up. Since the amount of sludge stored is greater, the drainage time may be reduced by about 50%.

BRIEF DESCRIPTION OF THE DRAWINGS

The other characteristic features of the invention will emerge from the following description, with reference to the attached drawings in which.

DESCRIPTION OF THE PREFERRED EMBODIMENT

Figure 1:
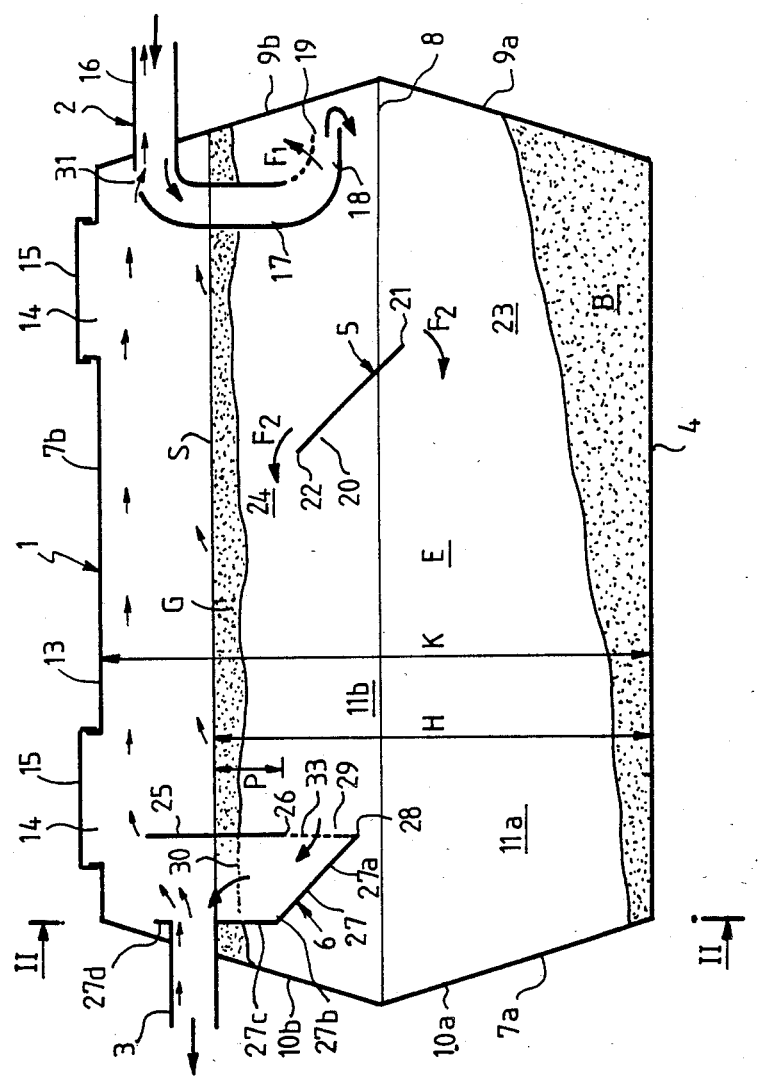
FIG. 1 is a schematic view, in vertical and longitudinal section, of a septic tank according to the invention.

The invention relates to an all-purpose septic tank which comprises a rigid chamber 1, a waste-water inlet pipe 2, an outlet pipe 3 for conveying the clarified waste water to a land treatment system not shown and not forming part, per se, of the invention.

The septic tank also comprises, in a manner known per se, means 5 for effecting clarification through deposition of the heaviest substances or sludge B on the bottom 4 of the chamber 1 and through accumulation of the greasy substances or light particles G on the free surface S and for at least partially liquefying these substances B, G by means of anaerobic fermentation.

Finally, the all-purpose septic tank according to the invention comprises means 6, incorporated inside the chamber 1, for protecting the land treatment system so as to prevent it becoming clogged up.

According to the invention, the clarification and liquefaction means 5 and the protection means 6 are located inside a single compartment of the chamber 1.

The chamber 1 comprises preferably two parts which are identical or substantially similar to one another, i.e. a lower shell 7a and an upper shell 7b. Each of the shells 7a, 7b has, longitudinally sectioned and transversely sectioned, the general shape of an isosceles trapezium. The two shells 7a, 7b are joined to each other by their large open common base 8.

The lower shell 7a comprises, therefore, in addition to the bottom 4 forming a small base, two end walls 9a and 10a, on the inlet side and outlet side respectively, and two side walls 11a, 12a, all inclined relative to the vertical, at an angle of approximately 30°.

The upper shell 7b has an upper cover 13 forming a small flat and horizontal base, two end walls 9b and 10b, on the inlet side and outlet side respectively, and two side walls 11b and 12b. The end walls 9b, 10b and the side walls 11b, 12b are inclined relative to the vertical in the same manner as the end walls 9a, 10a and the side walls 11a, 12a. The walls 9b, 10b, 11b, 12b of the shell 7b are joined to the walls 9a, 10a, 11a, 12a and the shell 7a at the base 8. The base 8 is therefore located midway between the bottom 4 and the cover 13.

Two ports 14, closed by covers 15, are provided on the cover 13. The ports 14 are located at the two end sections of the cover, in the vicinity of the end walls 9b, 10b.

According to the invention, the inlet pipe 2 forms a double bend folded back on itself and therefore has a horizontal upstream section 16, a vertical middle section 17 and a downstream section 18 which is also horizontal.

The upstream section 16 passes through the end wall 9b on the inlet side, in the vicinity of the cover 13. The downstream section 18 is directed generally towards the end wall 9a, 9b of the chamber 1 so that the effluent emerging from the inlet pipe 2 is directed towards this wall.

Moreover, the outlet 19 of the downstream section 18 is shaped as a gutter, being open upwards so that the effluent is also being directed upwards in the direction of the arrows $F_1$ (FIG. 1).

The all-purpose septic tank according to the invention also comprises a first deflector 20 located inside the chamber 1, transversely, at least substantially at the same height as the outlet 19 and forming at least partly the means 5. The first deflector 20 extends over all or at least a substantial part of the width of the chamber 1, i.e. between the side walls 11a, 11b, on the one hand, and the side walls 12a, 12b, on the other hand. The first deflector 20 has the function of improving clarification and of stopping the turbulence from reaching the bottom 4 of the chamber 1. This results in a water flow according to the arrows $F_2$ (FIG. 1). In a preferred embodiment, the first deflector 20 is inclined in particular at an angle of 35° to 55° relative to the vertical and in particular at an angle of aobut 45° from bottom 4 towards the cover 13 and from the end walls 9a, 9b on the inlet side towards the end walls 10a, 10b on the outlet side.

If H is the height of the water inside the chamber, this height being defined by the position of the outlet pipe 3 as will be seen below, the centre of the first deflector 20 is situated between 0.65 H and 0.75 H and in particular at about 0.70 H from the bottom 4.

The lower edge 21 of the first deflector 20 is situated at between 0.5 H and 0.60 H and in particular at about 0.55 H from the bottom 4. The upper edge 22 of the first deflector 20 is situated at between 0.75 H and 0.85 H and in particular at about 0.80 H from the bottom 4.

In the embodiment shown in FIG. 1, which corresponds to a possible, but not exclusive example, the first deflector 20 is situated at about a third of the way along the chamber 1 (i.e. between the end walls 9a, 9b and 10a, 10b), measured from the end walls 9a, 9b on the inlet side. More generally and in order to take into account the possible total volume of the upper septic tank, it is preferable for the first deflector 20 to be located at not too great a distance from the end walls 9a, 9b. For this reason, the first deflector 20 is generally situated at a distance from the joining point of the two walls 9a, 9b equal to or of the order of 5.5 to 7.7 times and preferably of the order of 6 to 7 times the diameter of the inlet pipe 2. Or, by way of variation, this distance is equal to or of the order of H.

The first deflector 20 thus defined leaves, on the one hand, a large lower passage 23 between its lower edge 21 and the bottom 4 and, on the other hand, a smaller upper passage 24 between its upper edge 22 and the free surface S. The lower passage 23 allows heavy substances or sludge B to pass through, while the upper passage 24 allows greasy substances and light particles G to pass through.

The first deflector 20 may be fixed, at the ends of its two sides, to the side walls 11a, 11b, 12a, 12b of the chamber 1.

The outlet pipe 3 positioned horizontally defines the level of the free surface S. The horizontal upstream section 16 of the inlet pipe 2 is located above the free surface S to prevent effluent flowing back into the inlet pipe 2.

As for the free surface S, it is situated at a distance H from the bottom 4, which is of the order of 0.7 K to 0.9 K and preferably equal to or in the region of 0.8 K, K being the distance between the bottom 4 and the cover 13.

A vertical partition 25 is associated with the outlet pipe 3 and is situated partly above and partly below the free surface S. For example, the lower edge 26 of the vertical partition 25 is situated at between 0.10 H and 0.20 H and in particular is equal to or in the region of 0.15 H from the free surface S. The free surface S is itself located substantially at about half the height of the partition 25.

A second deflector 27 is also associated with the outlet pipe 3 and has a lower section 27a inclined from the bottom 4 towards the cover 13 and from the end walls 9a, 9b towards the end walls 10a, 10b.

The vertical partition 25 is located substantially directly above the lower edge 28 of the second deflector 27. The vertical partition 25 and the second deflector 27 define a passage 29 for the clarified water. This passage 29 has an at least substantially vertical inlet opening defined by the lower edges 26, 28 of the partition 25 and of the second deflector 27, as well as a bend defined by the lower section 27a, so as to prevent floating substances passing through, and an outlet opening in a vertical section communicating with the outlet pipe 3. End side partitions 32 (FIG. 2) rigidly join together the vertical partition 25 and the second deflector 27. These vertical side partitions 32 have a trapezoidal shape, the small base of which corresponds to the upper section 27c, the large base to the distance between the upper edge of the partition 25 and the lower edge 28 of the deflector 27 and the width to the distance between the partition 25 and the upper section 27c. The partitions 32, together with the partition 25 and the second deflector 27, form a kind of housing inside which the water can penetrate only via the passage 29.

A grate 30 is positioned horizontally inside the passage 29 in the vicinity of the outlet and below the free surface S. Its position is such that it can be easily reached via the port 14 situated directly above it. It is detachably mounted.

Another grate 33, which is vertical and provides additional protection, is positioned inside the passage 29, at its inlet, thereby extending the partition 25 downwards as far as the edge 28. The waste stopped by the grate 33 is able to sink to the bottom or float freely as soon as the current ceases inside the septic tank.

Figure 2:
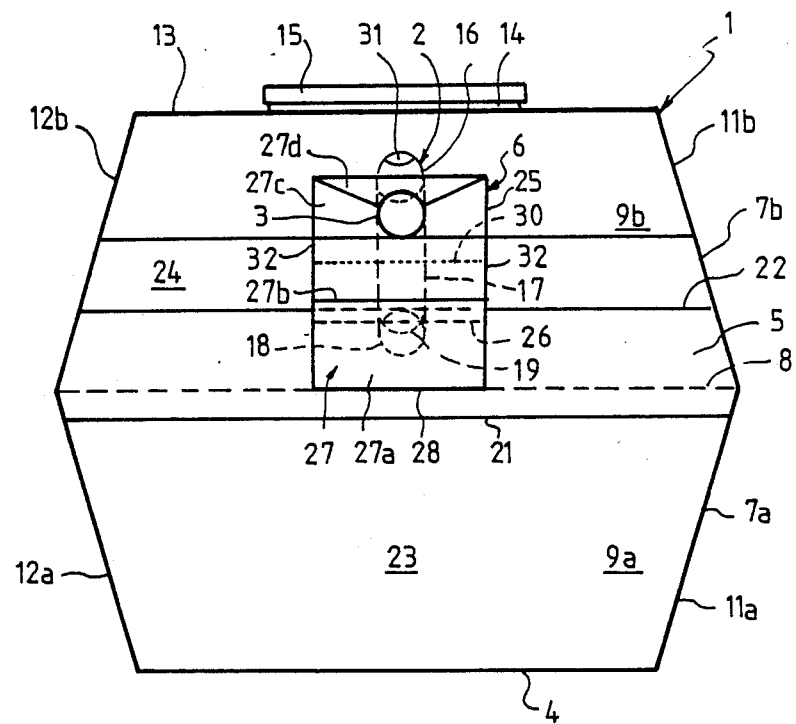
FIG. 2 is a transverse and vertical section along the line 2.2 of FIG. 1.

The vertical partition 25 and the second deflector 27 have an identical or similar width which may be limited to about 2.5 to 6 times and in particular about 4 times the diameter of the outlet pipe 3 (FIG. 2).

The distance between the lower free edges 26, 28 of the partition 25 and of the second deflector 27, i.e. the height of the inlet opening of the passage 29 may be between 0.9 P and 1.1 P and in particular equal or similar to P, P being the depth of immersion of the vertical partition 25. This distance may also be between about 0.10 H and 0.20 H and in particular equal or similar to 0.15 H.

The lower free edge 26 of the partition 25 is situated substantially at the same height as a ridge 27b separating the lower inclined section 27a of the second deflector 27 from an at least substantially vertical upper section 27c connected to the outlet pipe 3 and even projecting above the latter in the form of a section 27d.

The distance between the upper section 27c and the vertical partition 25 may be of the same order of magnitude as the height of the inlet opening of the passage 29, in particular between about 1 and 1.5 P or equal to or of the order of 0.2 H.

The inlet pipe 2, the outlet pipe 3 as well as the vertical partition 25 and the second deflector 27 are entirely located inside the upper shell 7b and the first deflector 20 is located at least partly inside the upper shell 7b and in the vicinity of the base 8.

The first deflector 20, the second deflector 27 and the partition 25 have small dimensions, allowing them to pass through the port 14.

The lower edge 21 of the first deflector 20 determines the permissible upper level of the sludge which has accumulated on the bottom 4 of the chamber 1.

The area of interchange between the sludge B accumulated on the bottom 4 of the chamber 1 and the liquid E floating on the surface is substantially equal to the total area of the horizontal section of the chamber 1 at the height of the lower edge 21 of the first deflector 20 or at the height of the upper surface of the sludge B.

An opening 31 provided in the top part of the supply duct 2 ensures that there is a free, continuous and permanent passage linking the outlet pipe 3, which is not submerged in the liquid inside the tank, and the inlet pipe 2, through which the air, necessary for operation of the all-purpose septic tank, is able to pass.

The first deflector 20, the second deflector 27 and the vertical partition 25 are, apart from the inlet and outlet pipes 2, 3, the only parts located inside the chamber 1. The chamber 1 therefore forms a single compartment which is not divided into two totally separate compartments by a vertical partition.

Several variations of embodiment of the invention are obviously possible.

I claim:

1. An all purpose septic tank system comprising:
    a liquid-fillable, single compartment, rigid chamber;
    an inlet conduit having a downstream section open upwards to allow a portion of the incoming waste to flow upwardly, wherein said inlet conduit communicates with said rigid chamber, and wherein said inlet conduit forms a double bend folded back onto itself;
    an outlet conduit communicating with said rigid chamber;
    clarification means within said rigid chamber for forcing the heaviest portions of the incoming waste to the bottom of said rigid chamber comprising a first angled deflector having upper and lower end portions, wherein said first deflector extends over a substantial part of the width of said rigid chamber for stopping turbulence from reaching the bottom of said rigid chamber and wherein said lower end portion of said first angled deflector is spaced from the bottom of said rigid chamber;
    protection means within said rigid chamber for preventing the clogging of land treatment systems comprising:
    a second deflector having a lower end, wherein said second deflector is, located near an end wall of said rigid chamber;
    a vertical partition spaced directly above the lower end of said second deflector said vertical partition being constructed and arranged to have a portion below the surface of the liquid in said rigid chamber;
    first and second side partitions connecting said second deflector to said vertical partition; and
    a passage communicating with said outlet conduit defined by said second deflector, said fist and second side partitions and said vertical position.

2. An apparatus according to claim 1, wherein said inlet conduit further comprises a vent communicating with the ambient air in said rigid chamber.

3. An apparatus according to claim 2, wherein said outlet conduit further comprises a vent constructed and arranged to permit the substantially continuous passage of air from said outlet conduit through said rigid chamber to said inlet conduit.

4. An apparatus according to claim 3, wherein said protection means further comprises a first grate connecting the lower end of said second deflector to said vertical partition.

5. An apparatus according to claim 4, wherein said protection means further comprises a second grate located in said passage.

6. An apparatus according to claim 5, wherein said first angled deflector defines a large upper passage above said first angled deflector and a substantially smaller lower passage below said lower end of said first angled deflector.

7. An apparatus according to claim 6, wherein said rigid chamber comprises substantially similar upper and lower component parts.

8. An apparatus according to claim 7, wherein said upper part comprises two end walls, two side walls connected to said two end walls, and an upper cover connected to each of said walls.

9. An apparatus according to claim 8, wherein each of said upper and lower component parts is substantially in the shape of an isosceles trapezoid.

10. An apparatus according to claim 9, wherein said lower part comprises two end walls, two side walls connected to said two end walls, and a base connected to each of said walls.

11. An apparatus according to claim 10, wherein said second deflector comprises a vertical upper section and an angled lower section.

12. An apparatus according to claim 11, constructed and arranged such that H defines the height of liquid in said rigid chamber and wherein the center of said first deflector is located in the range of about 0.65 H to about 0.75 H from the bottom of said rigid chamber.

13. An apparatus according to claim 12, wherein the upper end of said first angled deflector is located in the range of about 0.75 H to about 0.85 H from the bottom of said rigid chamber.

14. An apparatus according to claim 13, wherein the lower end of said first deflector is located about at 0.50 H to about 0.60 H from the bottom of said rigid chamber.

15. Apparatus according to claim 14, wherein the width of said vertical partition and said second deflector are in the range of about 2.5 to about 6 times the diameter of said outlet conduit.

16. An apparatus according to claim 15, wherein K defines the height of said rigid chamber and wherein said apparatus is constructed and arranged such that the height of liquid H in said rigid chamber is located in the range of about 0.7 K to about 0.9 K from the bottom of said rigid chamber.

17. An apparatus according to claim 16, wherein said first angled deflector is at an angle in the range from about 35° to about 55° from the vertical.

18. An apparatus according to claim 17, wherein each of said walls of said upper part is inclined at about 30° from the vertical.

19. An apparatus according to claim 18, wherein each of said walls of said lower part is inclined at about 30° from the vertical.

20. An apparatus according to claim 19, wherein said upper part further comprises first and second ports located near each of said end walls of said upper part, wherein each of said first and second ports is closed by a port cover.

21. An apparatus according to claim 20, wherein said first angled deflector is at an angle of about 45° from the vertical.

22. An apparatus according to claim 21, wherein the center of said first angled deflector is located at about 0.70H from the bottom of said rigid chamber.

23. An apparatus according to claim 22, wherein the upper end of said first angled deflector is located at about 0.80 H from the bottom of said rigid chamber.

24. An apparatus according to claim 23, wherein the lower end of said first deflector is located at about 0.55 H from the bottom of said rigid chamber.

25. An apparatus according to claim 24, constructed and arranged such that the height of liquid in said rigid chamber is about 0.8 K from the bottom of said rigid chamber.

26. An apparatus according to claim 25, wherein the lower end of said vertical partition is located in the range of about 0.10 H to about 0.20 H from the surface of the liquid.

27. An apparatus according to claim 26, wherein the lower end of said vertical partition is located at about 0.15 H from the surface of the liquid.

28. An all purpose septic tank system comprising: a liquid-fillable, single-compartment, rigid chamber;
an inlet conduit having a downstream section open upwards to allow a portion of the incoming waste to flow upwardly, wherein said inlet conduit communicates with said rigid chamber, wherein said inlet conduit forms a double bend folded back onto itself and wherein said inlet conduit further comprises a vent communicating with the ambient air in said rigid chamber;
an outlet conduit communicating with said rigid chamber, wherein said outlet conduit further comprises a vent in substantially continuous communication with the ambient air in said rigid chamber and in substantially continuous communication with said inlet conduit;
clarification means within said rigid chamber for forcing the heaviest portions of the incoming waste to the bottom of said rigid chamber comprising a first angled deflector having upper and lower end portions, wherein said first angled deflector extends over a substantial part of the width of said rigid chamber for stopping turbulence from reaching the bottom of said rigid chamber wherein said first angled deflector defines an upper passage above the upper end of said deflector and a lower passage below the lower end of said angled deflector; and
protection means within said rigid chamber for preventing the clogging of land treatment systems comprising:
a second deflector having a lower end, wherein said second deflector is located near an end wall of said rigid chamber;
a vertical partition spaced directly above the lower end of said second deflector having a portion below the surface of the liquid in said rigid chamber;
first and second side partitions connecting said second deflector to said vertical partition;
a first grate connecting the lower end of said second deflector to said vertical partition; and
a passage communicating with said outlet conduit defined by said second deflector, said first and second side partitions and said vertical partition.

29. An all purpose septic tank system comprising:
a liquid-fillable, single-compartment, rigid chamber comprising substantially similar upper and lower component parts wherein said upper part and said lower part are each substantially in the shape of an isosceles trapezoid;
an inlet conduit having a downstream section, wherein said inlet conduit communicates with said rigid chamber and wherein said inlet conduit forms a double bend folded back onto itself, and wherein said downstream section of said inlet conduit is open upwards to allow a portion of the incoming waste to flow upwards and wherein said inlet conduit further comprises a vent communicating with the ambient air in said rigid chamber;
an outlet conduit communicating with said rigid chamber, wherein said outlet conduit further comprises a vent which permits the substantially continuous passage of air from said outlet conduit through said rigid chamber to said inlet conduit;
clarification means within said rigid chamber for forcing the heaviest portions of the incoming waste to the bottom of said rigid chamber comprising a first angled deflector having upper and lower end portions, wherein said first angled deflector extends over a substantial part of the width of said rigid chamber wherein said first angled deflector defines an upper passage above the upper end of said angled deflector and lower passage below the lower end of said angled deflector; and
protection means within said rigid chamber for preventing the clogging of land treatment systems comprising:
a second deflector having a lower end, wherein said second deflector is located near an end wall of said rigid chamber;
a vertical partition spaced directly above the lower end of said second deflector having a portion below the surface of the liquid in said chamber;
first and second side partition connecting said second deflector to said vertical partition;
a first grate connecting the lower end of said second deflector to said vertical partition;
a passage communicating with said outlet conduit defined by said second deflector, said first and second side partitions and said vertical partition, and
a second grate located in said passage.

* * * * *